United States Patent [19]
Thor

[11] Patent Number: 5,533,017
[45] Date of Patent: Jul. 2, 1996

[54] LINE INTERFACE DEVICE FOR FAST-PACKET SWITCHING NETWORK

[75] Inventor: Allen Thor, Livingston, N.J.

[73] Assignee: Advanced Micro Devices, Inc., Parsippany, N.Y.

[21] Appl. No.: 236,853

[22] Filed: May 2, 1994

[51] Int. Cl.6 .................................................. H04L 12/56
[52] U.S. Cl. ........................... 370/60; 370/82; 370/94.2; 370/99; 370/105.1; 370/110.1; 375/376
[58] Field of Search .......................... 370/60, 60.1, 110.1, 370/94.1, 99, 100.1, 105.1, 79, 82, 85.9, 85.11; 375/118.1, 20

[56] References Cited

U.S. PATENT DOCUMENTS

| | | | |
|---|---|---|---|
| 4,488,289 | 12/1984 | Turner | 370/60 |
| 4,783,778 | 11/1988 | Finch et al. | 370/60 |
| 5,101,404 | 3/1992 | Kunimoto et al. | 370/60 |
| 5,115,208 | 5/1992 | Masdea et al. | 375/120 |
| 5,251,207 | 10/1993 | Abensour et al. | 370/110.1 |
| 5,315,588 | 5/1994 | Koyiwara et al. | 370/942 |

FOREIGN PATENT DOCUMENTS

| | | | |
|---|---|---|---|
| 9105419 | 4/1991 | European Pat. Off. | 370/60.1 |

Primary Examiner—Hassan Kizou
Assistant Examiner—Seema Rao

[57] ABSTRACT

Exchangeable LID modules are provided to enable the frame relay switching system to be interfaced to a specific data terminal, for example, synchronous, asynchronous terminals or T1 line, by performing on the receive side the physical translation of information on the input lines to clock signal CLK and HDLC framed data. On the transmit side, the HDLC framed data and clock signal CLK are translated into the data appropriate for a data terminal. The type of the translation is specific to the line to be interfaced with. To support a synchronous data terminal, a synchronous receiver is provided that extracts valid data patterns from a synchronous data stream. The data patterns are replaced with the data stream of appropriate levels when data are transmitted. When data are received from a T1 line, the LID splits the received data stream into user data and signalling data. The signalling data are buffered to form a signalling frame sent to a signalling frame relay packet management device (FRYPAM) separate from a user data FRYPAM that receives user data frames. To support an asynchronous data terminal, a microprocessor is provided to handle PAD and LAPB operations for transforming asynchronous data into X.25 format.

21 Claims, 6 Drawing Sheets

| | 7 | 6 | 5 | 4 | 3 | 2 | 1 | 0 |
|---|---|---|---|---|---|---|---|---|
| FLAG | | | | | | | | |
| DLCI (HIGH ORDER) | | | | | | | C/R | EA |
| DLCI | | | | FECN | BECN | DE | EA | |
| INFORMATION FIELD | | | | | | | | |
| FCS | | | | | | | | |
| FCS | | | | | | | | |
| FLAG | | | | | | | | |

Figure 1

LINE INTERFACE DEVICE FOR FAST-PACKET SWITCHING NETWORK

TECHNICAL FIELD

This invention relates generally to data packet switching, and more particularly, to a line interface device (LID) for frame relay and cell relay networks.

BACKGROUND ART

The basic concepts of fast-packet networks are found in intelligent end-user systems, reliable digital transmission facilities, and high-speed communication systems. The growth in computer applications which require high speed communications, the proliferation of intelligent PCS and work stations, and the growing availability of error-free high-speed transmission lines have combined to create a need for a new form of wide area network switching. This new switching technology requires high-speed, low delay, port sharing and band width sharing on a virtual circuit basis. TDM circuit switching provides the first two characteristics, and X.25 packet switching provides the last two. Fast-packet technology was developed as a new form of "packet mode" switching to provide all four characteristics, which together make fast-packet network an ideal solution for the bursty traffic sources found in LAN-WAN internetworking.

Fast-packet technology offers users the ability to improve performance (response time) and reduce transmission costs dramatically for a number of important types of network applications. In order to be effective, fast-packet networks require that three conditions be met: (1) the end devices must be running an intelligent higher-layer protocol; (2) the transmission lines must be virtually error-free; and (3) the application must tolerate variable delay.

Other wide area network switching technologies, such as X.25 packet switching and TDM circuit switching, will remain important where line quality is not as good, when the network itself must guarantee error-free delivery or when the traffic (e.g., video for voice) is intolerant of delay.

A fast-packet network provides a "packet mode" service which uses statistical multiplexing and port sharing characteristics. However, unlike X.25, the fast-packet network completely eliminates all processing at Layer 3. Furthermore, it uses only a portion of the functions of Layer 2, the so-called "core aspects," which include checking for a valid error-free frame but not requesting retransmission if an error is found. Thus, protocol functions such as sequence number, window rotation, acknowledgements and supervisory packets are not performed within the fast-packet network. The result of stripping so many functions out of fast-packet network is that through-put (i.e., the number of frames that can be processed per second for a given cost of hardware) can be dramatically increased, since each packet requires much less processing. For the same reason, the delay through a fast-packet network is lower than that of X.25 although it remains higher than a TDM network which does no processing at all.

In order to be able to remove so many functions from the fast-packet network, the end devices must take the responsibility for assuring the error-free end-to-end transmission of data. The fact is that more and more of the end devices, particularly those attached to LANs, have the intelligence and processing power to perform that function.

Frame relay and cell relay are the two divisions of fast-packet technologies. Frame relay uses a framing structure which has variable lengths ranging from just a few characters to well over a thousand. This feature, which it shares with X.25, is very important in making frame relay operate well with LANs and other sources of synchronous data traffic, which require variable frame sizes. It also means that the delays encountered by the traffic (although always lower than X.25) will vary depending upon the sizes of the frames being sent. Some types of traffic are intolerant of delay, particularly delay which is variable. Voice is one example and video is another. For that reason, frame relay is not well suited to carrying such delay-sensitive traffic. On the other hand, it is very well matched to the requirements of bursty data sources such as LAN-to-LAN traffic.

When compared to X.25 packet, frame relay makes a small change to the frame structure by adding to the header at the beginning of the frame. The frame relay header contains the Data Link Connection Identifier (DLCI), which is the frame relay virtual circuit number corresponding with a particular destination. In the case of LAN-WAN internetworking, the DLCI would denote the port to which the destination LAN is attached. The DLCI allows data coming into a frame relay network node to be sent across the network using a 3-step process:

1. Check the integrity of the frame using the Frame Check Sequence (FCS) and if it indicates an error, discard the frame.

2. Look at the DLCI in a table, and if the DLCI is not defined for this link, discard the frame.

3. Relay the frame toward its destination by sending it out the port or trunk specified in the table.

The two principal reasons frame relay data might be discarded are the detection of errors in the frame and the occurrence of congestion (the network is overloaded). The discard of frames does not interfere with the integrity of communications because of the intelligence in the end point devices such as PCs, work stations and hosts. These intelligent devices are operating with multi-level protocols which can detect and recover from loss of data in the network. The upper layer protocol in the end devices keeps track of the sequence numbers of the various frames sent and received. Acknowledgements are sent to inform the sending end which frame numbers have been successfully received. If a sequence number is missing, the receiving end will request a retransmittal. In this manner, the end devices assure that all of the frames eventually are received without errors.

FIG. 1 is a field diagram of the frame relay high-level data-link control (HDLC) format, comprising a flag area used for delimiting frames, followed by the DLCI area representing the addressing mechanism of frame relay. The DLCI consists of the six most significant bits of the second octet plus the four most significant bits of the third octet of the frame-relay frame. The DLCI bits of the second octet are followed by the Command/Response (C/R) indication bit. Additional bits, dependent upon the value of the extended address (EA) bit may be used to extend the DLCI beyond 10 bits to form a complete DLCI. The two-octet version of the DLCI shown in FIG. 1 covers 1024 addresses.

In present implementations of frame relay, there are several restrictions placed on the assignment of DLCI values per ANSI specification. DLCI 0 is reserved for in channel call control signalling. DLCIs 1 through 15 and 1008 through 1022 are reserved for future use, and DLCI 1023 is reserved for Local Management Interface (LMI) communications. This leaves the 992 DLCIs from 16 through 1007 available for user data. DLCIs 16–991 are assigned to logical connections and DLCIs 992–1007 are used for Layer 2 management.

The DLCI area is followed by the Forward Explicit Congestion Notification (FECN) and Backward Explicit Congestion Notification (BECN) bits. The FECN bit indicates that congestion avoidance procedures should be started in the direction of the frame (Source→Network→End point). This bit may be used by the receiving end point to adjust the rate of the destination-controlled transmitter. The end point should slow down transmission of messages resulting in responses/acknowledgements.

The BECN bit indicates that congestion avoidance procedures should be started in the opposite direction of the frame (End point→Network→Source). This bit may be used by the receiving end point to adjust the rate of the source-controlled transmitters. The source should slow down all transmissions to the network.

The Discard Eligibility (DE) bit is used to indicate a frame's suitability for discard in network congestion situations. The indicated frames should be discarded in preference to other frames during congestion.

The information field of variable length carries user control data and information that are not interpreted by frame relay.

The two-octet Frame Check Sequence (FCS) field following the information field is used to verify that a frame is not corrupted during transmission. The FCS is the result of applying the Cyclic Redundancy Checking (CRC) polynomial to the frame from the first bit of the address field to the last bit of the information field. The FCS is calculated by the source device and recalculated by the destination device. If the two FCSs do not match, then the frame is discarded. The FCS is followed by a closing flag.

Cell relay is another division of fast-packet technologies. Like frame relay, cell relay requires intelligent end systems, reliable digital transmission facilities, and high-bandwidth capacities. The major difference between frame relay and cell relay is the units of information transferred. While frame relay transfers information in variable length "frames", cell relay transfers information in fixed length "cells".

The frame relay protocol is defined in standards listed in Table 1. Cell relay is defined in the ATM and 802.6 DQDB standards.

TABLE 1

Frame relay and related standards

| Organization | Standard | Description |
|---|---|---|
| ANSI | T1.606-1990 | Integrated Services Digital Network (ISDN) - Frame Relaying Bearer Service - Architectural Framework and Service Description for Frame Relaying Bearer Service |
| ANSI | T1S1/90-175R4 | Addendum to T1.606 |
| ANSI | T1S1/88-2242 | Frame Relay Bearer Service - Architectural Framework and Service Description |
| ANSI | T1S1/90-214 (T1.6ca) | DSS1 - Care Aspects of Frame Protocol for Use with Frame Relay Bearer Service |
| ANSI | T1S1/90-213 (t1.6fr) | DSS1 - Signalling Specification for Frame Relay Bearer Service |
| CCITT | 1.122 | Framework for Providing Additional Packet Mode Bearer Services |
| CCITT | 1.431 | Primary (1544.2048 Kbps) ISDN Interface |
| CCITT | Q.922 | ISDN Data Link Layer Specification for Frame Mode Bearer Service |
| CCITT | Q.931 | ISDN Network Protocol |
| CCITT | Q.933 | ISDN Signalling Specification for Frame Mode Bearer Services |

In typical implementations, the frame relay and cell relay protocols are performed in software. The throughput of the system is limited by processor power. Therefore, there is a need for frame relay and cell relay to be implemented in hardware without limiting the frame or cell relay system to specific networking solutions. Accordingly, it would be desirable to provide exchangeable line interface modules to support various line interfaces and provide connections between specific networking solutions and the frame or cell relay network.

DISCLOSURE OF THE INVENTION

One advantage of the invention is in providing exchangeable line interface modules in a modular frame or cell relay network to support various line interfaces corresponding to specific networking solutions of the frame or cell relay.

Another advantage of the invention is in providing line interface devices in a frame or cell relay network to enable the network to handle frame or cell relay requirements in a wide range of data rates.

A further advantage of the invention is in providing line interface devices in a frame or cell relay network to enable the network to address a variety of system interconnection standards.

Another advantage of the invention is in providing a standard hardware interface to the frame or cell network that can support future network specific interfaces at various data rates.

The above and other advantages of the invention are achieved, at least, in part, by providing a system for interfacing a packet switching network to a plurality of transmitting and receiving data terminals. The system comprises a receiving line circuit responsive to the transmitting data terminals for converting transmitted data into a logic data signal having logic levels compatible with the switch implementation. An interface control circuit responsive to a control processor of the network supplies the interfacing system with address fields to provide switching. A signal forming circuit responsive to the receiving line circuit and interface control circuit supplies the switching network with a clock signal and data packet including the data signal and the address field. Finally, a transmitting line circuit responsive to the data packet from the switching network removes the address field and converts the data signal into received data supplied to the receiving data terminal.

In accordance with one aspect of the present invention, the data packet comprises a data frame of variable length corresponding to the frame relay requirements.

In accordance with another aspect of the invention, the data packet comprises a data cell of fixed length corresponding to the cell relay requirements.

In accordance with a preferred embodiment of the invention, to provide an interface with synchronous data terminals, the receiving line circuit comprises a data buffer for converting the transmitted data into the logic data signals and a synchronous receiver for selecting valid data from a sync pattern transmitted by the transmitting terminal. The signal forming circuit provides a clock signal at a frequency selected to allow the address field to be sent with each byte of the valid data, and may comprise a packet buffer for buffering a plurality of the valid data bytes. The transmitting line circuit comprises a synchronous transmitter for replacing the sync pattern with the valid data received from the switching network.

To interface with a T1 line supporting the frame or cell relay network, the signal forming circuit may comprise a phased-locked loop for extracting clock information from the transmitted data and a signalling data selector for separating signalling information from data information in the transmitted data. A signalling data buffer accumulates a plurality of signalling bits to form a signalling data packet. The interface control circuit provides the signalling data packet with a signalling address field. The signal forming circuit supplies signalling information packets to the switching network via separate signalling lines. The transmitting line circuit comprises a signalling data mixer for mixing the signalling data packet received from the switching network with the received data.

To interface with asynchronous terminals, the signal forming circuit may comprise means for packet assembling in response to asynchronous data transmitted from the transmitting data terminals, and the transmitting line circuit may comprise means for packet disassembling to supply the receiving data terminals with the asynchronous data in response to the data packet from the switching network. The means for packet assembling and disassembling may comprise a packet assembly-disassembly processor and a memory for accumulating the data packets. Also, the signal forming circuit comprises an asynchronous receiver for supplying the packet assembling means with the asynchronous data, and the transmitting line circuit comprises an asynchronous transmitter for transmitting the asynchronous data from the packet disassembling means to the receiving data terminals.

In accordance with a further aspect of the invention, in a frame relay network, a module for interfacing a plurality of receiving and transmitting end points to a system for switching frame relay packets, comprises a line adapting circuit for supplying the module with information signals from the transmitting end points and for supplying the receiving end points with the information signals from the module. A control circuit supplies the module with frame relay address data from a network processor. Packet processing means responsive to the line adapting and control circuits adds frame relay address data to the information signals to form the frame relay packets supplied to the switching system. On the receiving side of the switching system, the packet processing means removes the frame relay data from the frame relay packets to form the information signals supplied to the receiving end points.

In accordance with the method of this invention, in a fast packet network the following steps are carried out for interfacing transmitting and receiving terminals to a system for switching data packets:

adapting information signals from the transmitting terminals to the network to form internal signals transferred via a network, adding network address fields supplied from a network address source to the network signals to form the data packets supplied to the switching system, removing the network address fields from the data packets supplied from the switching system to form the network signals, and adapting the network signals for sending to the receiving terminals.

Still other advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF DRAWINGS

FIG. 1 is a diagram showing a frame format in a Frame Relay network.

BEST MODE FOR CARRYING OUT THE INVENTION

Although the invention has general applicability in the field of data packet manipulation, the best mode for practicing the invention is based in part on the realization that the data packets transferred over the packet switching network have the frame relay HDLC format shown in FIG. 1. Accordingly, whereas the disclosure of this invention will be made in the field of frame relay, it is to be understood that the invention is not to be so limited.

Figure 2:
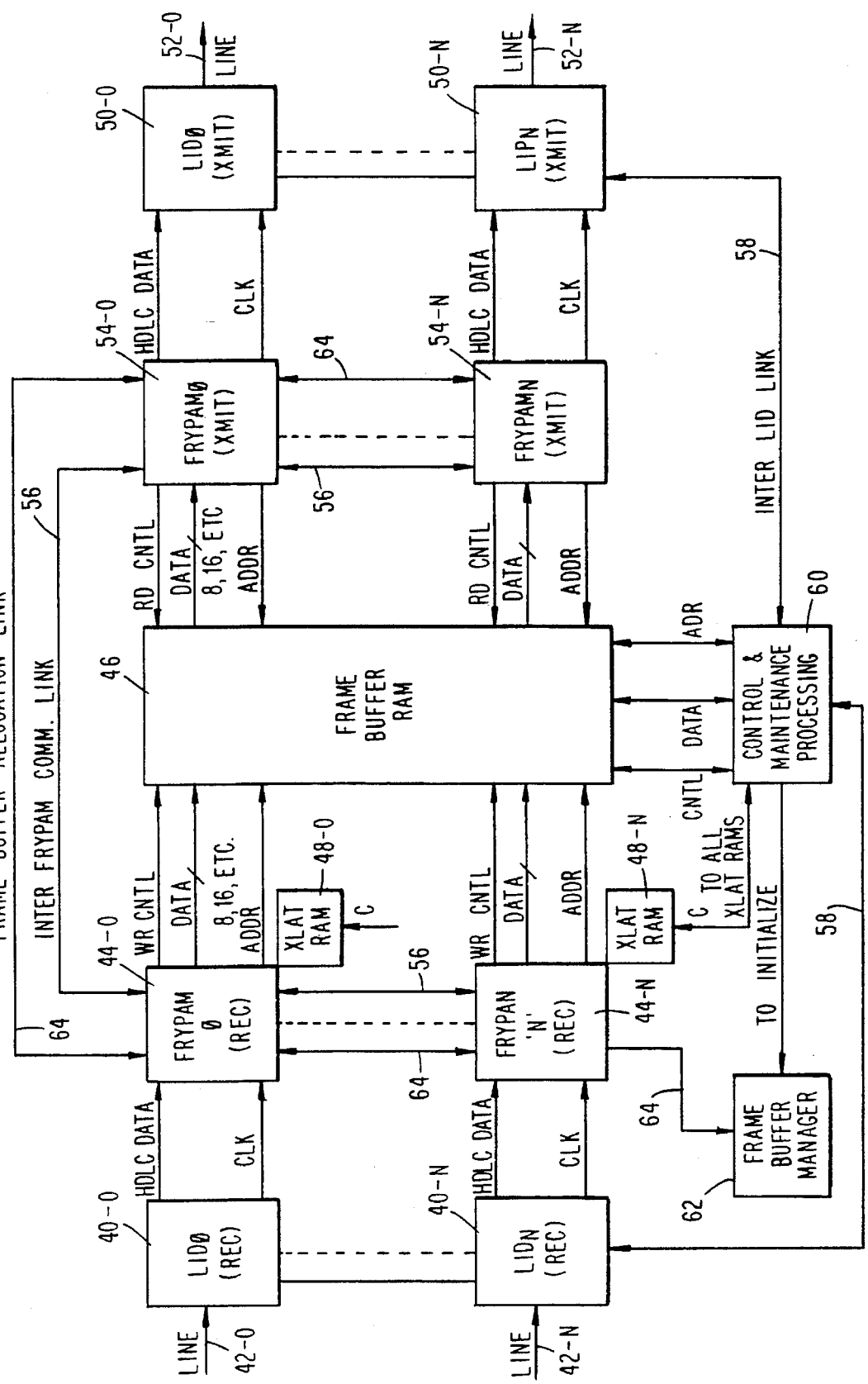
FIG. 2 is a diagram illustrating general architecture of a switching network in accordance with the present invention.

Referring to FIG. 2, in a frame relay network, line interface devices (LIDs) LIDo–LIDn are coupled through input/output (I/O) communication lines to end devices. To make the disclosure more clear, FIG. 2 shows receiving and transmitting sections of the LIDs as separate blocks 40-0–40-N and 50-0–50-N, respectively, coupled to input communication lines 42-0–42-N and output communication lines 52-0–52-0. However, it is to be understood that LIDs 40 and 50 may be implemented as integral devices provided bi-directional line interface with an I/O communication bus. The LIDs may interface the network to a specific data terminal, for example, synchronous, asynchronous terminals or T1 line, by performing on the receive side the physical translation of information on the input lines to clock signal CLK and HDLC framed data having the format shown in FIG. 1. On the transmit side, the HDLC framed data and clock signal CLK are translated into the data appropriate for an end device. The type of the translation is specific to the line to be interfaced with. The LIDs structure and operation will be described in more detail later.

The data frames transferred through the switching network are buffered in a frame buffer RAM 46 coupled to the LIDs through corresponding Frame Relay Packet Management devices (FRYPAM). The receiving FRYPAM sections 44-0–44-N provide management of the frame queue transmitted from the receiving LID sections 40-0–40-N, respectively. The transmitting FRYPAM sections 54-0–54-N transfer the frames read from the frame buffer RAM 46 to the transmitting LID sections 50-0–50-N, respectively.

As indicated above, an input to the receiving FRYPAM from the receiving LID comprises HDLC framed data and clock CLK. The FRYPAM checks the FCS field of the frame that may comprise a cyclic redundancy code (CRC). The frame is discarded, if its CRC has an error. Further, the FRYPAM extracts the 10-bit DLCI field of the received frame and uses this value as the address into a translation (XLAT) RAM 48 attached to each receiving FRYPAM.

Figure 3:
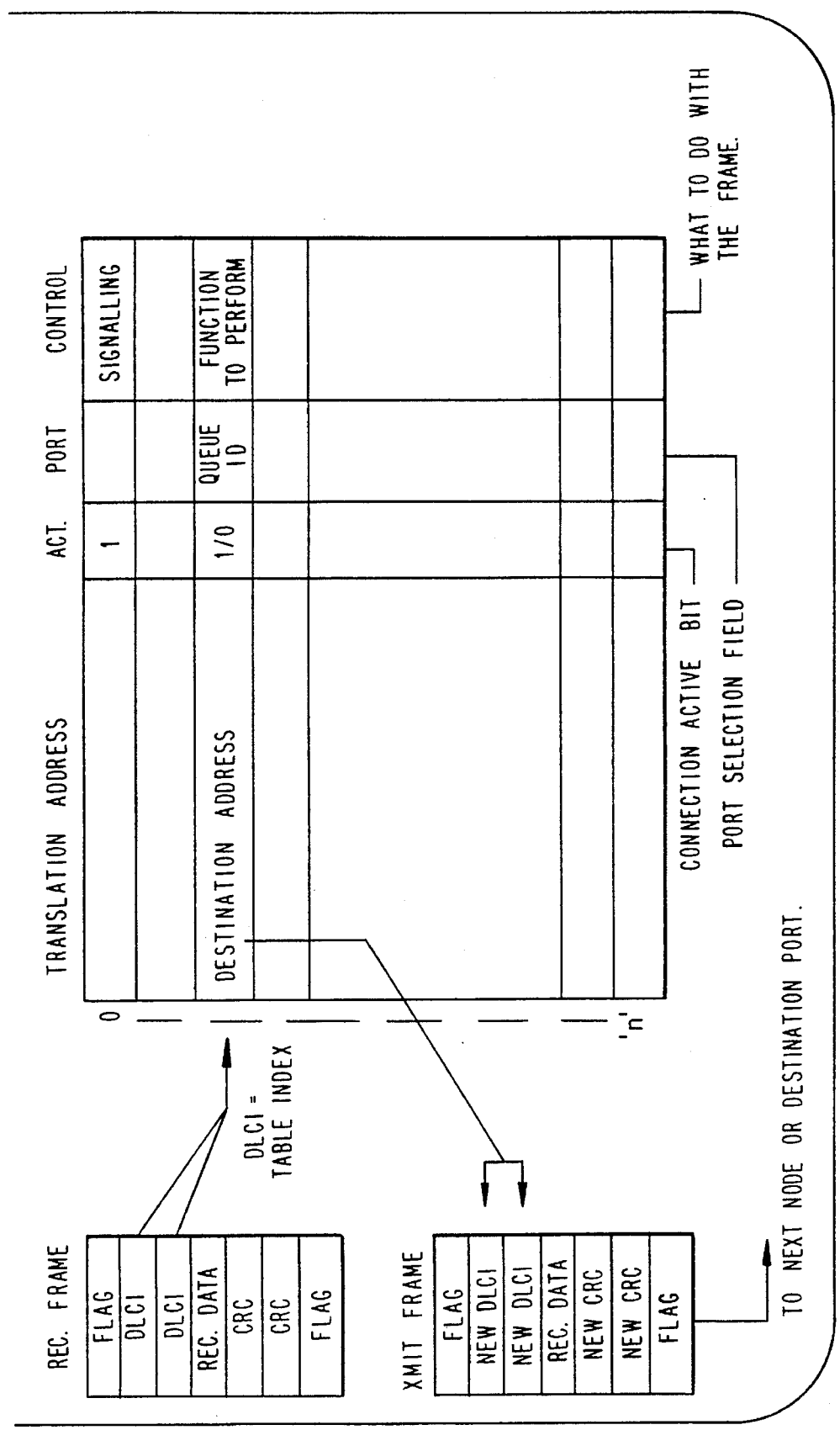
FIG. 3 shows a look-up table in an XLAT RAM.

Each of the translation RAMs 48-0–48-N respectively coupled to the FRYPAMs 44-0–44-N comprises a look-up table shown in FIG. 3 that contains a list of destination addresses, connection active bits, port selection fields and control field. As frames are received by the FRYPAM, the extracted DLCI address field provides an index to a new destination address in the table. The new destination address is read from the translation RAM to replace the address in the received frame. The same index is used to select the destination port and to determine additional functions to be performed with the received frame. If the connection active bit indicates that the DLCI is not active, the frame is discarded.

If the frame is to be relayed, its DLCI is replaced with the new destination address, and the receiving FRYPAM generates a write control signal WR CNTL and addressing signal ADDR to write the new address together with the remaining frame data in the location of the frame buffer RAM. When a complete frame has been stored in the frame buffer RAM, the receiving FRYPAM sends a packet availability message to the destination transmitting FRYPAM via inter FRYPAM communication link 56 that connects all of the transmitting and-receiving FRYPAMs. The identification number of the destination FRYPAM is read from the look-up table in the translation RAM. The packet availability message comprises the address of the frame in the frame buffer RAM and byte counts indicating the length of the frame. The transmitting FRYPAM maintains a transmit queue for all frames it must transmit. It generates a read control signal RD CNTL and addressing signal ADDR to read the frames from the frame buffer RAM 46 and to send them to the corresponding transmitting LID 50 in the HDLC format (HDLC data) together with a clock signal CLK. The transmitting LIDs convert the HDLC data from the FRYPAMs to the format appropriate for the specific line interface. This information is then transmitted over the communication lines 52 to the receiving end device or data terminal. Like the LIDs, the FRYPAM receiving and transmitting sections may be implemented in an integral device. The frame processing procedure performed by the receiving and transmitting FRYPAMs and their structure is disclosed in more detail in my copending application Ser. No. 08/207,520, entitled "Packet Management Device for Fast-Packet Network," filed concurrently herewith and incorporated by reference.

If the look-up table in the translation RAM indicates that the received frame carries control or maintenance information, the transmission FRYPAM sends this frame to a control and maintenance processor 60 that handles control and maintenance operations in the switching network. The processor 60 uses the control and maintenance frames to update the contents of the translation RAMs in real time as virtual connections are altered. It may also perform call processing functions to support switched services and respond to or initiate maintenance operations throughout the network, for example, loopbacks or error counts. Furthermore, the control and maintenance processor 60 communicates DLCI and line interface parameters to LIDs via an inter LID link 58 that connects all of the LIDs to each other and to the processor 60.

As indicated above, the receiving FRYPAMs write the received frames into the frame buffer RAM 46. With multiple FRYPAMs writing into a common frame buffer RAM having a plurality of frame buffers, a frame buffer manager 62 that maintains a dynamic list of available frame buffers of the RAM provides allocation of the frame buffers for the receiving FRYPAM operations. The communication between the FRYPAMs and the frame buffer manager occurs over a frame buffer allocation link 64 that connects all of the FRYPAMs to each other and to the frame buffer manager 62. Over this link, the transmitting FRYPAMs send deallocating signals that cause the frame buffer manager to release the allocated buffers when the data has been transmitted on the line. The frame buffer continuously tries to maintain buffers for all receiving FRYPAMs. If no buffers are available, the received frame is discarded. All frames are allocated the same amount of space in the frame buffer RAM. This space may be large enough to buffer the largest frame available on the network (typically 4K bytes). The structure and operation of the system shown in FIG. 2 are disclosed in more detail in my copending application Ser. No. 08/188,873, entitled "Modular Architecture For Fast-Packet Network." filed concurrently herewith and incorporated by reference.

Figure 4:
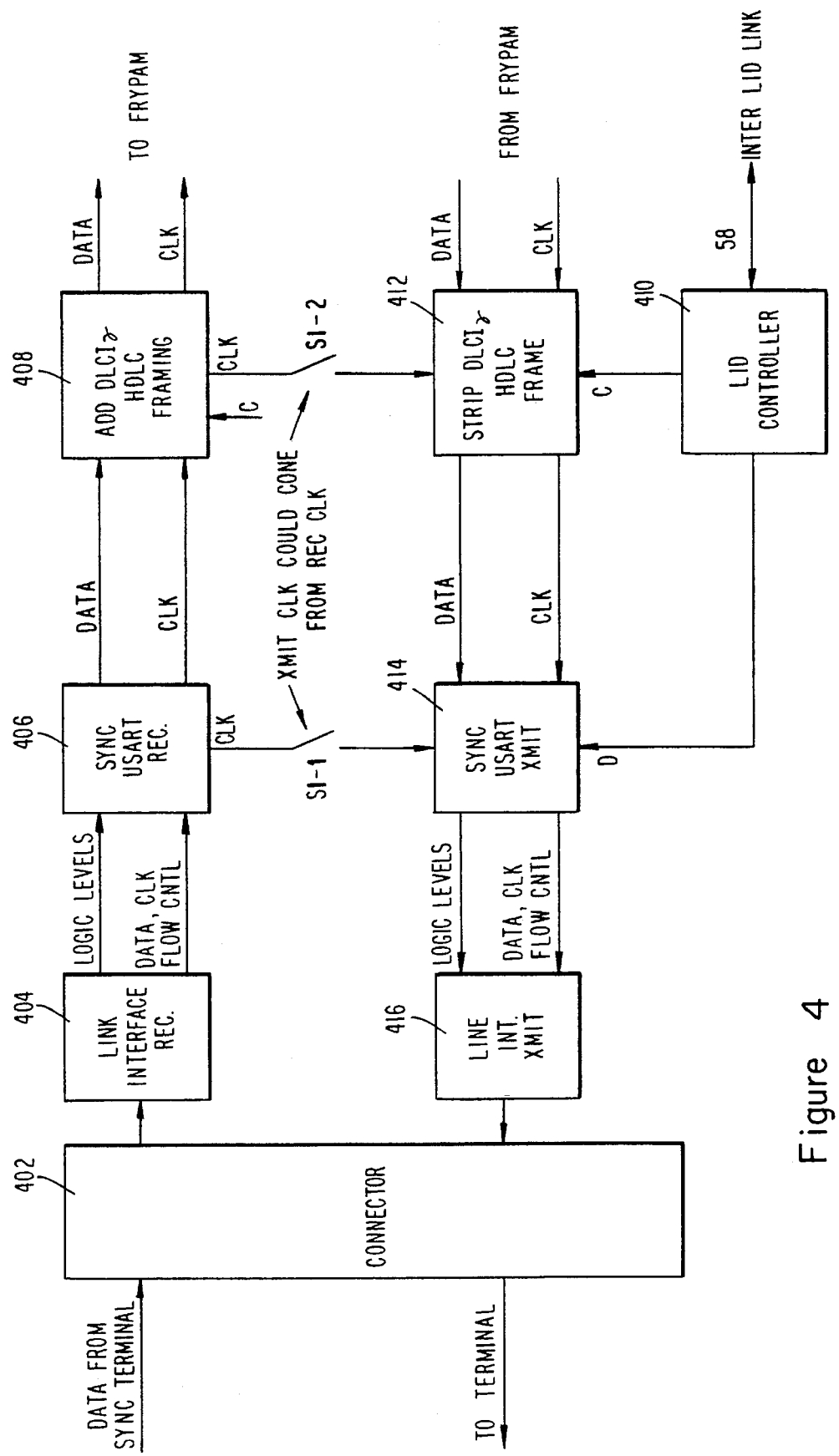
FIG. 4 is a diagram of a LID that supports synchronous data transmission.

Reference is now made to FIG. 4 showing the LID that interfaces the frame relay switching system to a synchronous data terminal. A physical connector 402 coupled to the data terminal may be part of the LID or may be located elsewhere in the switching network. The received signals are buffered by a line interface receiver 404 that converts the line levels to logic levels of the system. For example, RS232 or RS422 receivers may be used as the line interface receiver 404. The adapted synchronous signal stream including data and clock symbols is processed by a synchronous receiver 406 that may be a section of a universal synchronous/asynchronous receiver/transmitter (USART). The synchronous receiver extracts the data and clock signal from the total received stream. In practice, the synchronous terminal in the idle state continuously sends a known sync pattern (typically 1 byte in length) which is not considered as a valid data character. When the terminal transmits data bytes, they replace the sync pattern. The synchronous receiver 406 recognizes the data bytes as a valid data pattern and passes them to a HDLC framer 408. The sync patterns are ignored and not transferred to the framer 408.

As indicated above, the control and maintenance processor 60 through the inter LID link 58 supplies the LID with the appropriate DLCI and line interface parameters and may request loopback operations and other relevant control and maintenance procedures. The link 58 may be implemented by any protocol that supports full duplex communication, for example by serial polling, parallel polling, multimaster HDLC, token passing, CSMA/CD, etc.

A LID controller 410 coupled to the inter LID link provides the HDLC framer 408 with HDLC and control information supplied through the input C to encapsulate the received data bytes into an HDLC frame with the appropriate DLCI. The HDLC framed data together with a clock signal is transferred to the FRYPAM. Since the framing operations increases the overall length of the received data, the clocking rate supplied to the FRYPAM may be more than 6 times the synchronous terminal line rate to enable the DLCI, CRC and other additional fields of the HDLC frame to be added to each received data byte. Preferably, several received data bytes are buffered before sending them to the FRYPAM. Hence, the LID may include a microprocessor to determine when or how large a data frame should be sent to the FRYPAM. However, it is to be understood that the same result may be achieved by other methods apparent to those skilled in this art.

On the transmit side, the frames sent by the FRYPAM are supplied to a disassembling circuit 412 that removes the DLCI, CRC and other additional HDLC fields and transfers the data to a synchronous transmitter 414 of the USART unit. The clock information may be supplied to the transmitting circuits from the FRYPAM or may be transferred from the corresponding receiving circuits of the LID by closing the contacts of the switch S1. The LID controller 410 transfers the sync pattern and maintenance information to the synchronous transmitter 414 through the input D. The synchronous transmitter 414 in the idle state transmits the sync pattern replaced with the synchronous data stream when the data are supplied from the FRYPAM. The synchronous data stream including data and clock components is supplied to a line interface driver 416 that converts the logic levels received from the synchronous transmitter into the levels appropriate for the synchronous terminal receiving the data stream. RS232 or RS422 transmitters are examples of the line interface driver 416.

Figure 5:
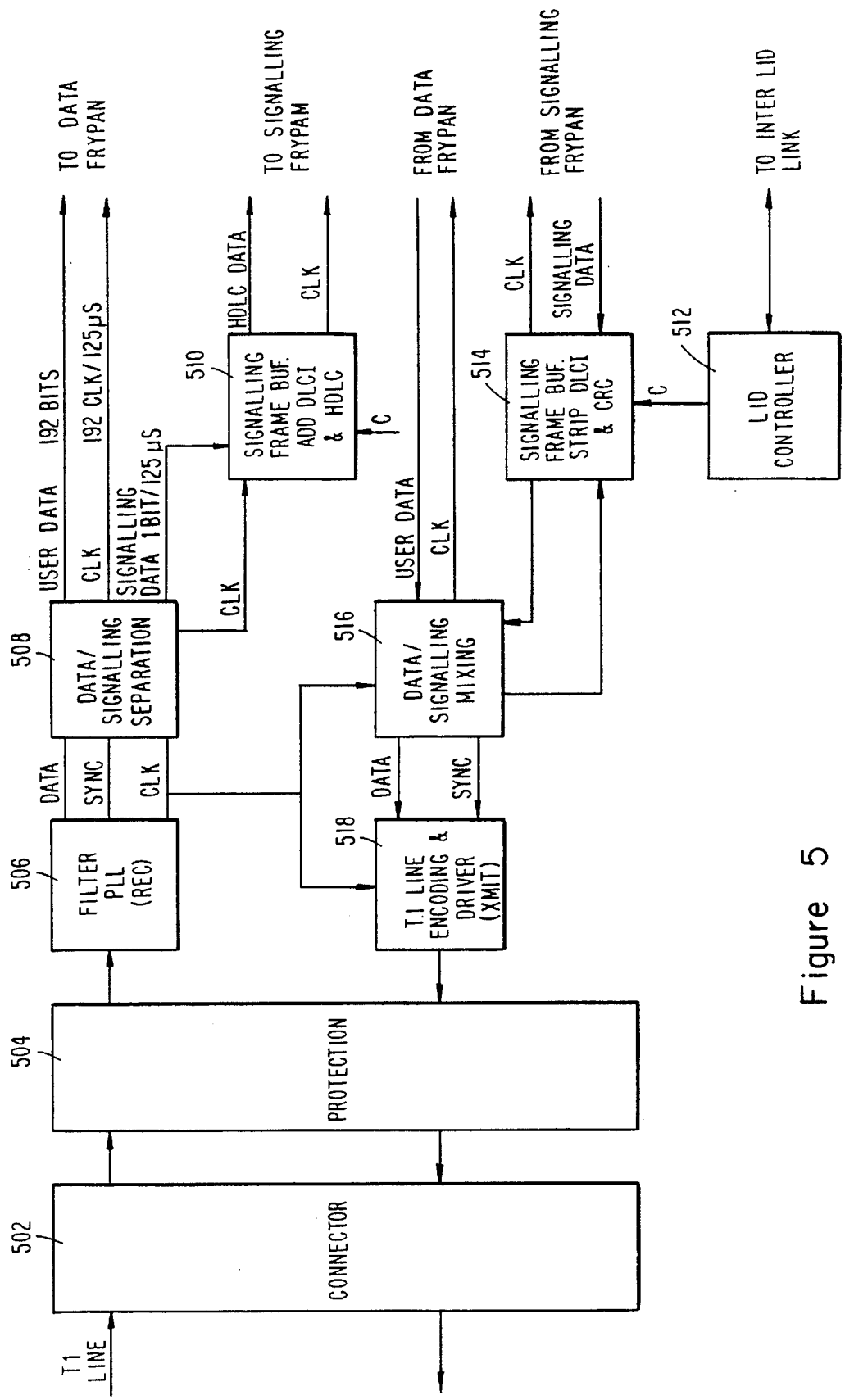
FIG. 5 is a diagram of a LID that interfaces the frame relay switching network to a T1 line.

Reference is now made to FIG. 5 of the drawings showing a LID that interfaces the frame relay switching system to a T1 line. It is assumed that the data stream transferred to the frame relay through the T1 line is already in HDLC format. A physical connector 502 coupled to the T1 line may be part of the LID or may be located elsewhere in the switching system. A protection circuit 504 coupled to the connector 502 is provided to protect the LID from external hazardous inputs, for example, from lightning and AC power. Such a protection system is typical for line interfaces that couple wide area networks to customer premises, central office or any other point. A phase-locked loop (PLL) and filter circuit 506 provides filtering of the received data stream and extracts the clock information from the stream using the PLL to form data, clock and frame sync signals at the system logic levels. A data/signalling separation circuit 508 uses these signals to separate signalling data from user data. To transfer one signalling frame, 193 bit frame is required. Accordingly, for 192 bits of the user data, the separation circuit 508 forms 1 bit of the signalling data. The length of the 193 bit stream may be equal to 125 µs. The user data which are already in HDLC format, together with the corresponding clock signals are transferred to the FRYPAM. The signalling bits are accumulated in a signalling frame buffer 510, which receives HDLC information through a control input C from a LID controller 512 coupled to the inter LID link and the clock signals from the separation circuit 508. The signalling frame buffer 510 adds the assigned DLCI, CRC and other HDLC fields to the signalling data to form an HDLC frame to be sent to the FRYPAM. The signalling frames may be handled by the control and maintenance processor. Preferably, the user data and signalling data are respectively transferred to separate data and signalling FRYPAMs.

On the transmit side, the signalling FRYPAM transfers the signalling frames to a signalling frame buffer 514, which receives the DLCI and CRC information through a control input C from the LID controller 512, in order to remove the DLCI, CRC and other additional fields from the signalling frame. A data/signalling mixing circuit 516 combines the signalling data supplied from the buffer 514 with the user data supplied from the data FRYPAM. When no data is available the data FRYPAM supplies HDLC flags.

The mixer 516 controlled by the clock signal formed in the receive path, supplies the clock to the data and signalling FRYPAMs in the transmit path to control the transmission rate of the FRYPAMs and frame buffer RAM. This prevents FRYPAMs from being overflowed and enables the frame buffer RAM to hold all data until they are sent.

The mixed data and the corresponding sync signals are supplied from the mixer 516 to a T1 line encoding and driving circuit 518 that adapts the transmitted data to the T1 line. The encoding and driving circuit 518 supports T1 line framing in accordance with the corresponding standards.

As discussed above, the LID controller 512 allows the control and maintenance processor to transfer HDLC information to the LID and requests loopbacks and other relevant control and maintenance procedures.

Figure 6:
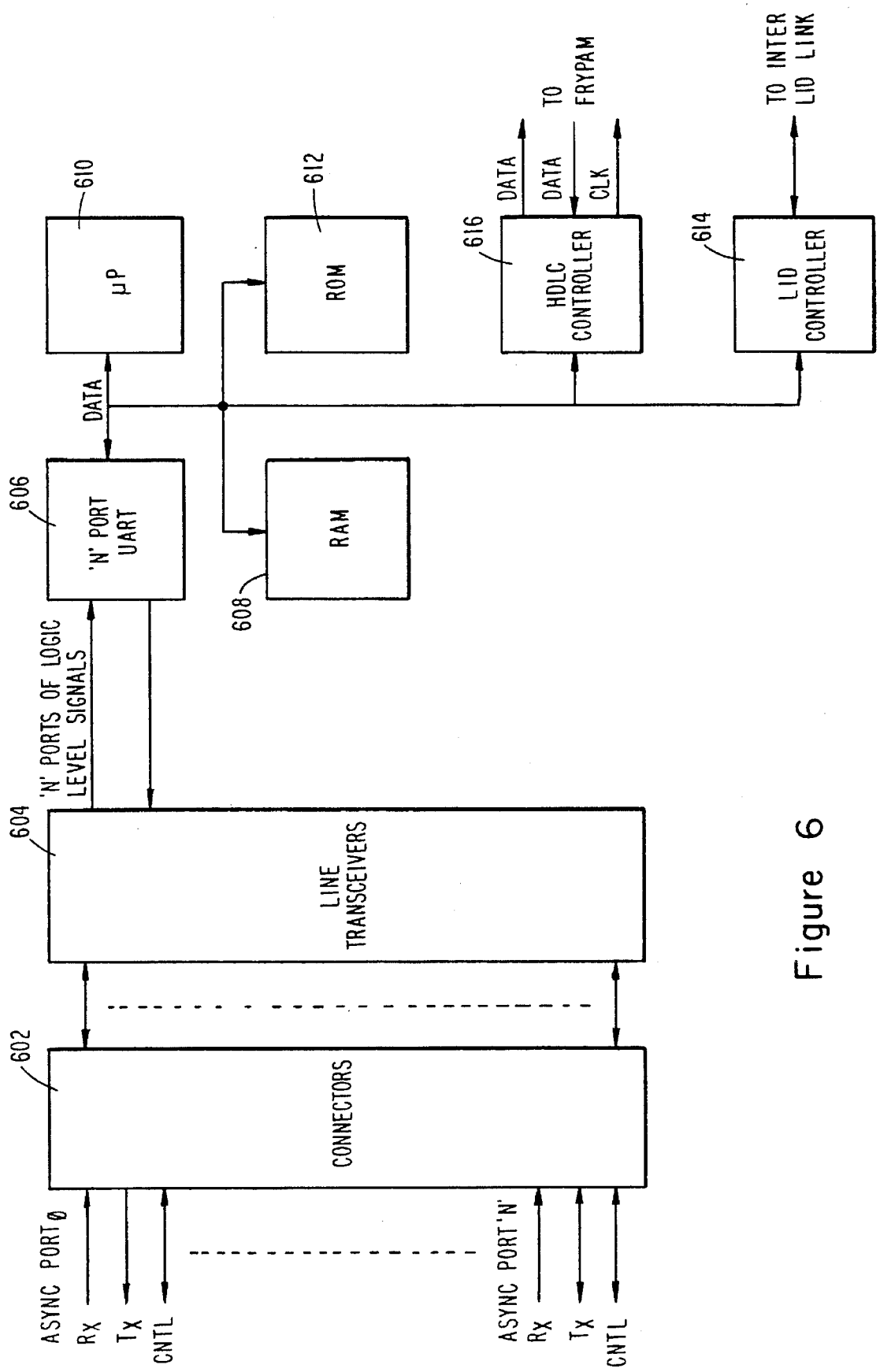
FIG. 6 is a diagram of a LID that supports a plurality of asynchronous data terminals.

Reference is now made to FIG. 6 of the drawings showing the LID for interfacing the frame relay switching system to an n-port X.25 network. Each of asynchronous ports O to N of the LID supports transmission (Tx) and reception (Rx) of data and control bits (CNTL) to and from asynchronous terminals O to N. Connectors 602 provides physical connection of the corresponding terminals to the switching system. Line transceivers 604 convert the levels of the received signals into the logic levels of the system and through n ports supply the corresponding logic level signals to an n-port universal asynchronous receiver/transmitter (UART) 606. The UART 606 supports receive, transmit and hardware flow control operations between the asynchronous terminals and a RAM 608. A microprocessor 610 handles hardware and software flow control procedures to provide data exchange between the RAM 608 and the UART 606. The program is supplied to the microprocessor 610 from a ROM 612 or any other program storage means, for example, flash memory, SRAM, DRAM, etc. The microprocessor supports packet assembly/disassembly (PAD) and balanced link-access procedure (LAPB) functions for each asynchronous port in accordance with the X.3, X.21 and X.25 recommendations. Thus, the RAM 608 contains the received data in X.25 format.

A LID controller 614 coupled to the inter LID link provides DLCI, CRC and additional HDLC information required to encapsulate the X.25 data into a frame relay HDLC frame. Based on this information, an HDLC controller 616 adds the assigned DLCI and forms the HDLC frame sent to the FRYPAM, together with a clock signal. For each X.25 connection, a separate DLCI field is assigned by the control and maintenance processor via the LID controller. When multiple X.25 connections are destined for the same endpoint, the same DLCI fields are assigned to each connection.

On the transmit side, the HDLC data from the FRYPAM are supplied to the HDLC controller 616 that removes additional HDLC fields and forms X.25 transmit data transferred to the RAM 608. As discussed above, the UART 606 supported by the microprocessor 606 provides asynchronous data transmission to the designated asynchronous terminal.

There accordingly have been described exchangeable LID modules that enable the frame relay switching system to be interfaced to a specific data terminal, for example, synchronous, asynchronous terminals or T1 line, by performing on the receive side the physical translation of information on the input lines to clock signal CLK and HDLC framed data. On the transmit side, the HDLC framed data and clock signal CLK are translated into the data appropriate for a data terminal. The type of the translation is specific to the line to be interfaced with.

Accordingly, the disclosed structure allows a wide range of networking solutions to be addressed with a few exchangeable modules and provides a standard network interface to the frame or cell relay network that can support future network specific interfaces at various data rates.

In this disclosure, there are shown and described only the preferred embodiments of the invention, but it is to be understood that the invention is capable of changes and modifications within the scope of the inventive concept as expressed herein.

I claim:

1. Apparatus for interfacing a packet switching network to a plurality of transmitting and receiving data terminals, comprising:

a receiving line circuit responsive to said transmitting data terminals for converting transmitted data supplied via receiving lines coupled to said transmitting data terminals into a logic data signal having logic levels compatible with said switching network, an interface control circuit responsive to a control processor of said network for supplying an address field;

a signal forming circuit responsive to said receiving line circuit and interface control circuit for supplying said switching network with a clock signal and data packet including said data signal and said address field at said logic levels, and a transmitting line circuit responsive to said data packet from said switching network for removing said address field and converting said data signal into received data supplied via transmitting lines to said receiving data terminals, said interface control circuit including a plurality of control units interconnected by an interface control link coupled to said control processor, each of said control units being provided for a corresponding line of said transmitting and receiving lines to supply said interface control circuit with address information corresponding to said line and to request control and maintenance procedures in response to an instruction from said control processor.

2. The apparatus of claim 1, wherein said data packet comprises a data frame of variable length.

3. The apparatus of claim 1, wherein said data packet comprises a data cell of fixed length.

4. The apparatus of claim 1, wherein said receiving line circuit comprises a data buffer for converting the transmitted data into said logic data signals.

5. The apparatus of claim 1, wherein said signal forming circuit comprises a phased-locked loop for extracting clock information from said transmitted data.

6. The apparatus of claim 1, wherein said signal forming circuit comprises a signalling data selector for selecting signalling data from said transmitted data.

7. The apparatus of claim 6, wherein said signal forming circuit comprises a signalling data buffer for accumulating a plurality of data packets to form a signalling data packet.

8. The apparatus of claim 7, wherein said interface control circuit provides said signalling data packet with a signalling address field.

9. The apparatus of claim 8, wherein said signal forming circuit supplies said switching network via a separate signalling line for sending the signalling data packet.

10. The apparatus of claim 8, wherein said transmitting line circuit comprises a signalling data mixer for mixing the signalling data packet received from the switching network with the received data.

11. The apparatus of claim 1, wherein said signal forming circuit comprises means for packet assembling in response to asynchronous data transmitted from the transmitting data terminals, and said transmitting line circuit comprises means for packet disassembling to supply the receiving data terminals with the asynchronous data in response to the data packet from the switching network.

12. The apparatus of claim 11, wherein said means for packet assembling and disassembling comprise a packet assembly-disassembly processor and a memory for accumulating the data packets.

13. The apparatus of claim 12, wherein said signal forming circuit comprises an asynchronous receiver for supplying said packet assembling means with the asynchronous data, and said transmitting line circuit comprises an asynchronous transmitter for transmitting the asynchronous data from said packet disassembling means to said receiving data terminals.

14. The apparatus of claim 1, wherein said receiving and transmitting line circuits, interface control circuit and signal forming circuit are incorporated into an exchangeable line interface module for interfacing said packet switching network to a data terminal of a specific type.

15. Apparatus for interfacing a packet switching network to a plurality of transmitting and receiving data terminals, comprising:

a receiving line circuit responsive to said transmitting data terminals for converting transmitted data into a logic data signal having logic levels compatible with said switching network, said receiving line circuit including a synchronous receiver for selecting valid data from a sync pattern transmitted by said transmitting terminals an interface control circuit responsive to a control processor of said network for supplying an address field, a signal forming circuit responsive to said receiving line circuit and interface control circuit for supplying said switching network with a clock signal and data packet including said data signal and said address field at said logic levels, and a transmitting line circuit responsive to said data packet from said switching network for removing said address field and converting said data signal into received data supplied to said receiving data terminals.

16. The apparatus of claim 15, wherein said signal forming circuit provides the clock signal at a frequency selected to allow the address field to be sent with each byte of said valid data.

17. The apparatus of claim 16, wherein said signal forming circuit comprises a packet buffer for buffering at a programmable level a plurality of valid data bytes.

18. The apparatus of claim 15, wherein said transmitting line circuit comprises a synchronous transmitter for replacing said sync pattern with the valid data received from the switching network.

19. In a frame relay network, a module for interfacing a plurality of receiving and transmitting end points to a system for switching frame relay packets, comprising:

a line adapting circuit for supplying said module with information signals received via receiving lines from said transmitting end points and for supplying said receiving end points with said information signals from said module via transmitting lines, a control circuit for supplying the module with frame relay address data from a network processor, and packet processing means responsive to said line adapting and control circuit for adding said frame relay address data to said information signals to form said frame relay packets supplied to said switching system and for removing said frame relay address data from said frame relay packets to form said information signals supplied to said receiving end points, said control circuit including a plurality of control units interconnected by an interface control link coupled to said network processor, each of said control units being provided for a corresponding line of said transmitting and receiving lines to supply said control circuit with address information corresponding to said line and to request control and maintenance procedures in response to an instruction from said network processor.

20. In a fast-packet network, a method of interfacing transmitting and receiving terminals to a system for switching data packets comprising the steps of:

adapting information signals from said transmitting terminals to said network to form network signals, adding network address fields supplied by a control processor from a network address source to the network signals to form the data packets supplied to said system for switching data packets, said network address fields being supplied for each destination associated with said network through a control unit provided in said system for switching for said destination, said control processor supplying an instruction to said control unit to request control and maintenance procedures, removing said network address fields from the data packets supplied from said switching system to form the network signals, and adapting the network signals for sending to said receiving terminals.

21. The method of claim 20, wherein full duplex communication is provided between said control units via an interface control link.

* * * * *